Sept. 22, 1964 P. J. FREY ETAL 3,149,805
JET CURTAIN V/STOL SYSTEM
Filed May 27, 1963 3 Sheets-Sheet 1

INVENTORS
FRED G. WAGNER
PETER J. FREY
BY
Knox & Knox

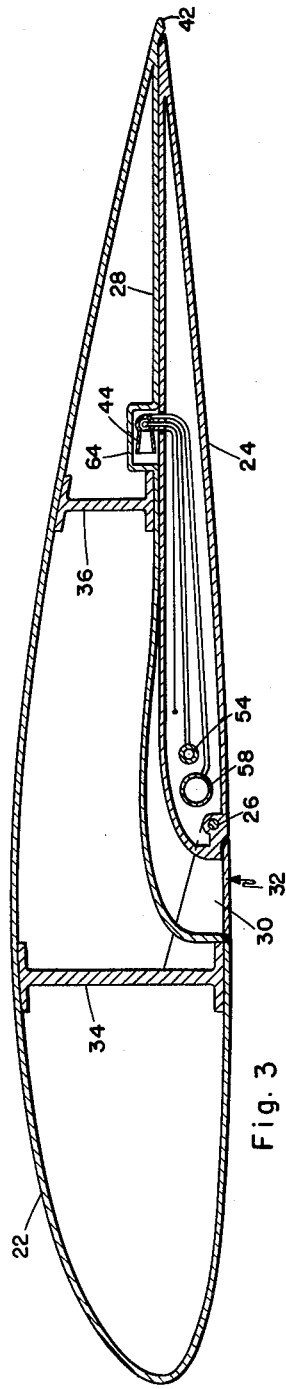
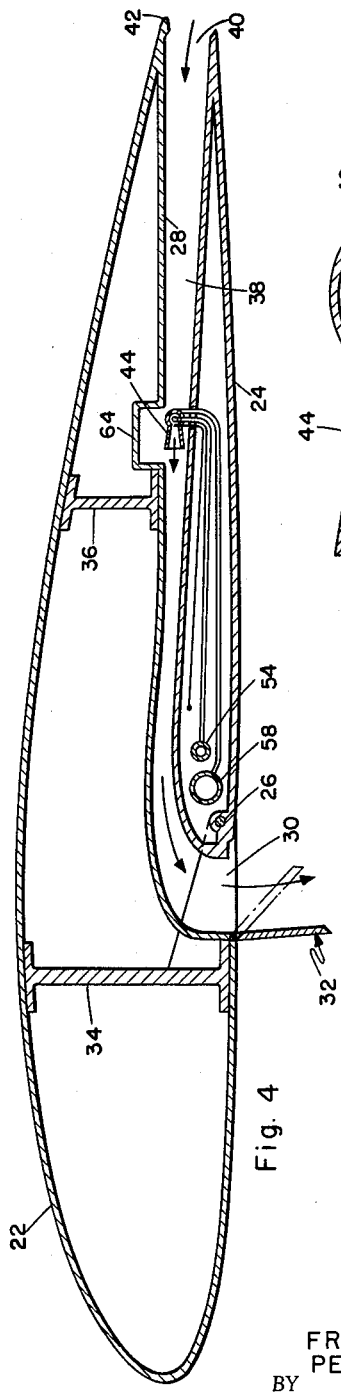
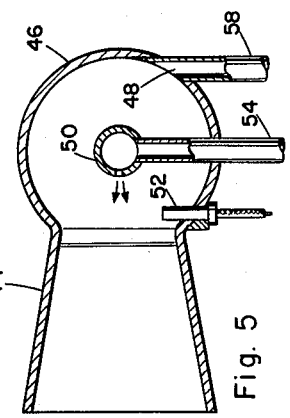
INVENTORS
FRED G. WAGNER
PETER J. FREY
BY
Knox & Knox

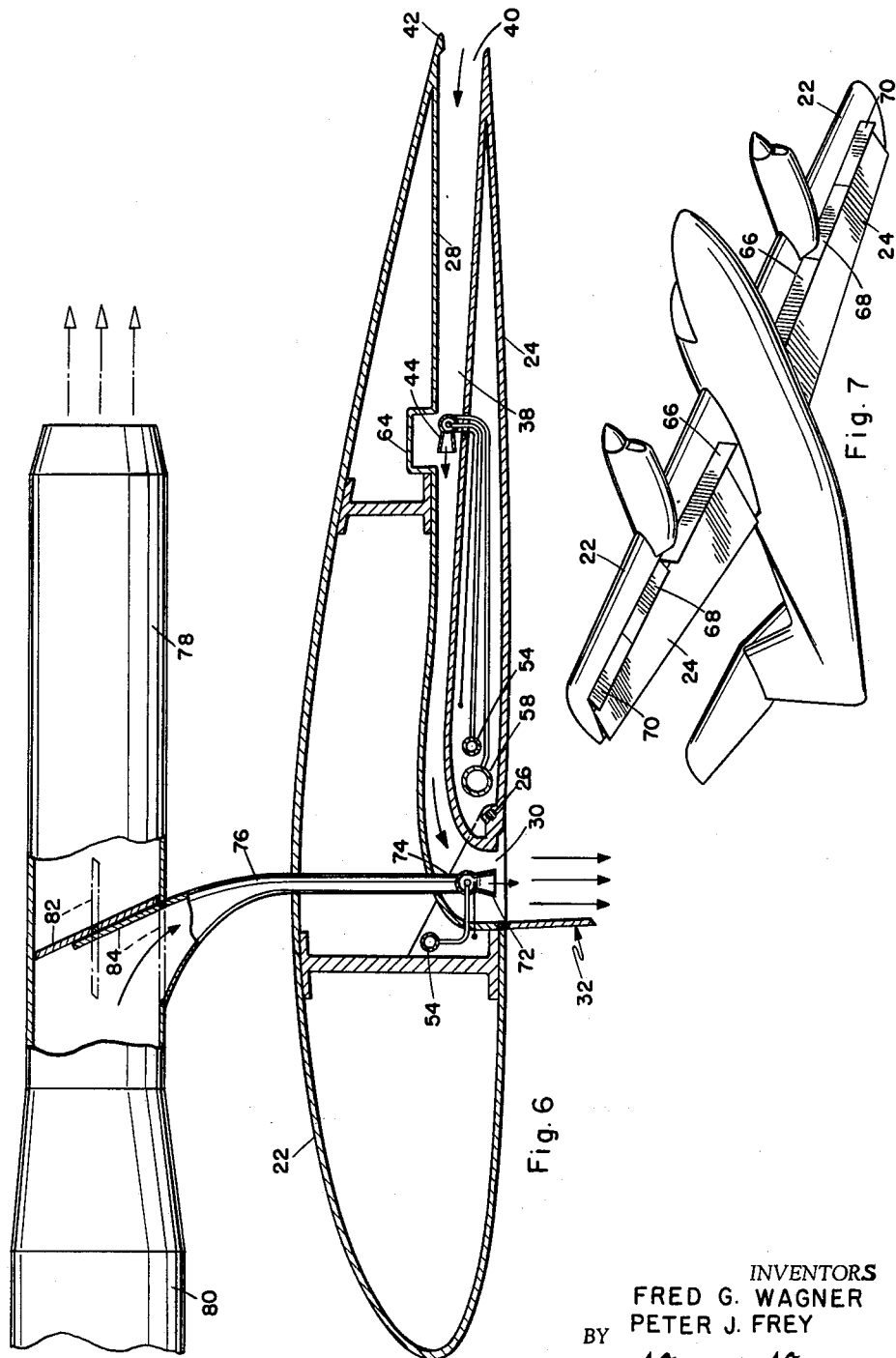

3,149,805
JET CURTAIN V/STOL SYSTEM
Peter J. Frey and Fred G. Wagner, San Diego, Calif., assignors to The Ryan Aeronautical Co., San Diego, Calif.
Filed May 27, 1963, Ser. No. 283,383
11 Claims. (Cl. 244—42)

The present invention relates generally to aircraft and more specifically to a jet curtain V/STOL system for aircraft.

Various systems have been devised for providing aircraft with increased lift for take off and landing in a minimum distance, or even vertically. Boundary layer control systems are particularly effective and usually involve suction or blowing of air over flaps and other surfaces to enhance lift. Such systems have permanent ducts between inlets and outlets which usually must be incorporated into wing structures, causing weakening of primary structure and interfering with accessibility. Due to ducting restrictions in most cases, air flow is limited and the maximum advantages cannot be realized.

The primary object of this invention is to provide a V/STOL system in which air is drawn in at the trailing edge of a wing and exhausted downwardly by jet pump action, the effect being to displace the normal aerodynamic stagnation points from the leading and trailing edges of the wing and to move the resultant effective stagnation point downwardly from the wing, the result being to increase the coefficient of lift of the wing.

Another object of this invention is to provide a V/STOL system in which the complete air directing means is incorporated into a panel on the underside of the wing and forming the lower wing surface over virtually the entire wing span, the panel hinging downwardly to expose a duct which is closed when the system is inoperative.

Another object of this invention is to provide a V/STOL system having simple jet pump means in the air duct to entrain the air flow, no moving parts being necessary and the air flow being unobstructed with no baffles or changes in direction until the final exit.

Still another object of this invention is to provide a V/STOL system wherein the downward air flow from the wing is in the form of a jet curtain, which can be controlled by small flaps for longitudinal trim and control, as well as for roll and yaw control and trim.

A further object of this invention is to provide a V/STOL system wherein a secondary jet pump can be incorporated into the duct exit and provided with exhaust gases from primary propulsion engines to operate in the manner of an afterburner, the added thrust making fully vertical take off and landing possible.

With these and other objects in view, this invention consists in the novel construction combination and arrangement of portions, as will be hereinafter described in the specification, particularly pointed out in the claims, and illustrated in the drawings which form a material part of this disclosure, and in which:

FIGURE 3 is an enlarged sectional view taken on line 3—3 of FIGURE 2, with the system in inoperative position;

FIGURE 4 is a view similar to FIGURE 3, with the system in operation;

FIGURE 5 is an enlarged sectional view of a suitable driving nozzle structure for the jet pump;

FIGURE 6 is a sectional view similar to FIGURE 4, illustrating a modified structure incorporating a secondary jet pump operable as an afterburner; and FIGURE 7 is a perspective view, from below, of an aircraft, illustrating the use of the jet curtain control flaps.

Similar characters of reference indicate similar or identical elements and portions throughout the specification and throughout the views of the drawings.

*Airflow Characteristics*

Figure 1:
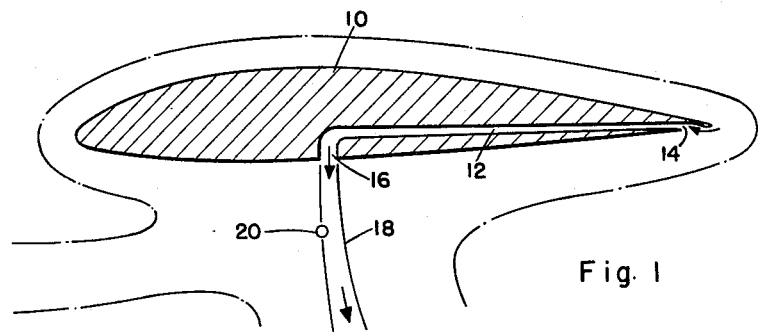
FIGURE 1 is a diagram of the air flow around a wing incorporating the present system.

Referring now to FIGURE 1, a typical wing airfoil 10 is illustrated with a duct 12 extending from a lower trailing edge inlet 14 to an outlet 16 in the underside of the wing. If air is drawn in at the inlet 14 and ejected from outlet 16, a downwardly directed jet curtain 18 will be provided. In addition to the direct thrust of this jet curtain, the effects on the air surrounding the wing greatly enhance lift. The flow pattern around the airfoil in parallel flow and with the jet curtain operating is indicated in broken line. Normally stagnation points occur in the air flow at the leading and trailing edges. However, the downwardly directed jet curtain 18 and the suction at the trailing edge inlet 14 secure attached flow at usually large downward angles, creating large lift coefficient increases. This has the effect of moving the stagnation points from the leading and trailing edges toward each other and downwardly, it being theoretically possible to bring the stagnation points together at a common point 20 below the wing. The suction air drawn into the jet and the air mixed with the jet curtain below the wing are contributing factors to the lift coefficient increase in forward flight and augment the reaction lift generated at zero forward speed. In addition, the suction at the lower side of the trailing edge relieves or eliminates the Kutta-Joukowsky air flow condition at the trailing edge.

*System Layout and Structure*

Figure 2:
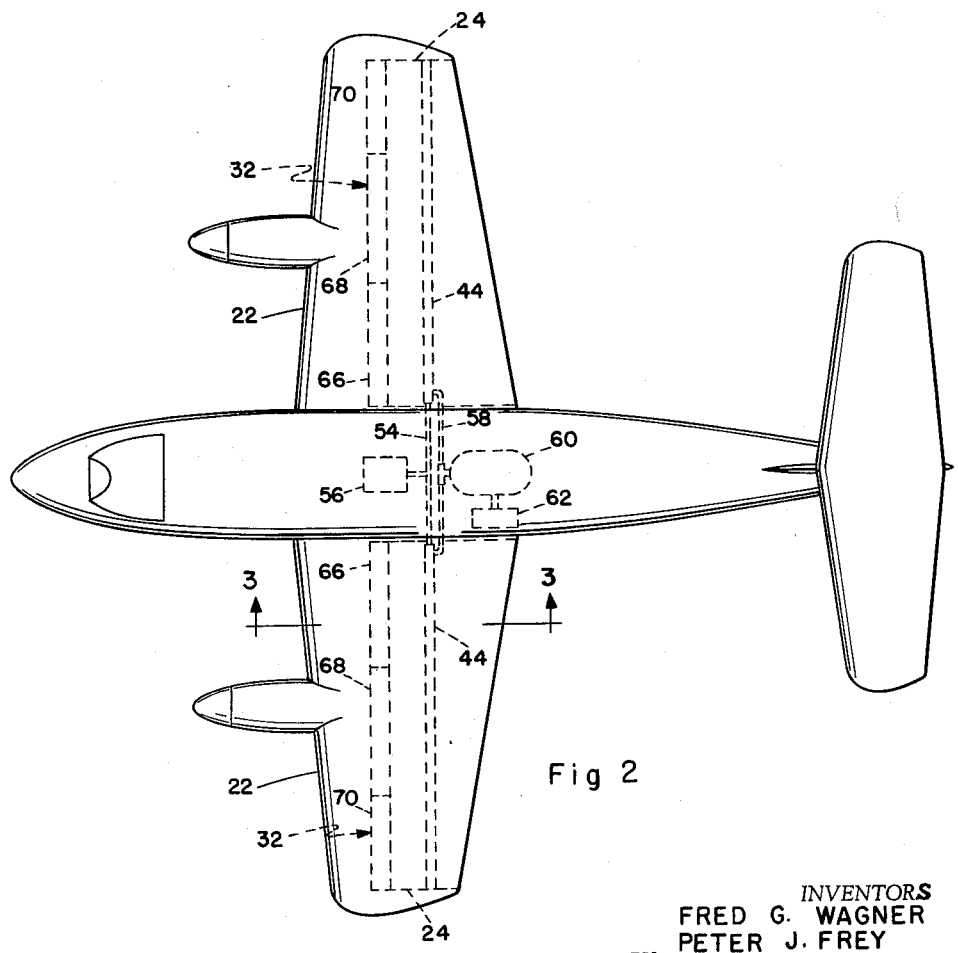
FIGURE 2 is a top plan view of a typical aircraft indicating the general layout of the system.

The aircraft illustrated in FIGURE 2 is of generally conventional design and is intended only as an example. Each wing 22 has a large panel 24 forming the lower rear portion of the wing, as will be evident in FIGURES 3 and 4, the panel being pivotally attached to the wing at its forward edge by a hinge 26 to swing downwardly away from the wing. The primary wing structure is conventional, the lower skin 28 against which panel 24 seats being recessed to incorporate the panel into the normal airfoil. At the forward end of panel 24 the skin 28 is extended forwardly to define a downwardly opening outlet 30 between the forward edge of said panel and the primary wing structure, the outlet being closed by control flaps generally indicated at 32 hinged at their forward edges to the wing. The panel 24 and its associated structure can extend for virtually the full span of the wing as illustrated, but could be divided into sections if necessary to clear engine installations or other wing mounted structures. The panel 24 is of the nature of a flap and may be operated by any suitable mechanism used for conventional wing flaps, an example being illustrated in U.S. Patent No. 3,131,873. It should be noted that the wing spars 34 and 36 and other primary structure are unbroken, the operable portion of the system being contained in a relatively thin lower panel, which does not weaken the structure in any way.

When the panel 24 is hinged downwardly, as in FIGURE 4, a duct 38 is opened between the panel and skin 28, with an inlet 40 at the underside of wing trailing edge 42, the duct extending directly forwardly to the outlet 30. The specific cross sectional shape of the duct 38 will depend on flow requirements and various other factors and is easily incorporated into the skin profiles. The chordwise location of the outlet 30 also can vary considerably depending on the aerodynamic characteristics of the aircraft.

On top of the panel 24 is a jet pump 44 extending spanwise throughout the entire duct 38 and directed forwardly. As illustrated in FIGURE 5, the jet pump 44 has, by way of an example, a nozzle-like cross section with a combustion chamber 46 and can be a continuous, elongated member or a plurality of nozzle units distributed spanwise along panel 24. The combustion chamber 46 has an air inlet 48 and a fuel spray bar 50, with suitable ignition means 52 adjacent the nozzle portion. Spray bars 50 are connected through the panels 24 to fuel supply lines 54 which lead to a fuel tank 56 conveniently located in the aircraft, the tank being pressurized or provided with any suitable pump to distribute fuel. The air inlets 48 are connected through air supply lines 58 to an air pressure reservoir 60 charged by a compressor 62, which can be independently powered or driven from one of the aircraft's primary propulsion engines. A spanwise channel 64 is provided in each lower skin 28 to receive the jet pump 44 when panel 24 is closed, FIGURES 3 and 4 being typical of any chordal cross section of the wing.

The control flaps 32 are preferably divided spanwise into separate flaps for control and trim purposes, as hereinafter described, the arrangement illustrated including inboard flaps 66, intermediate flaps 68 and outboard flaps 70. Other arrangements may be used depending on the particular aircraft and the degree of control required.

*Operation*

When the system is not required the panels 24 are retracted and the wings have conventional airfoils, which can be designed for any performance range. The system is sufficiently compact for installation in the thin wings of supersonic aircraft, which can benefit greatly from the added lift at the take off and landing.

When increased lift is required, as when taking off with a heavy load or from a restricted area, or landing in a miminum of space, the panels 24 are hinged downwardly to open ducts 38. Fuel and air are then supplied to jet pumps 44 and the mixture ignited, the resultant flow of combustion gases causing entrainment of ambient air through the ducts. As is well known in the jet pump art, a small volume of gas flow from the jet pump is capable of entraining a large volume of air, the mixing of the cool air with the jet pump gases having considerable cooling effect and making it unnecessary to use expensive heat resistant materials in the duct structure.

Air is drawn in at the trailing edge inlets 40 and ejected through the outlet 30 as a downwardly flowing jet curtain. As previously described, this increases the lift coefficient of the wing and provides aerodynamic lift by causing motion of air around the wing, in addition to the direct thrust of the jet curtain.

By deflecting the control flaps 66, 68 and 70 in various ways the jet curtain effects can be used for control at low speed and during hovering or vertical flight. As illustrated in FIGURE 7, the outboard flaps 70 and intermediate flaps 68 on one wing are deflected rearwardly to a considerable degree, while the other flaps are generally perpendicular. This rearwardly deflected jet curtain on one side causes a yawing action of the aircraft and, by unequal downward thrust, also provides a rolling action. The various flaps can be actuated in different combinations for aircraft control. For instance, the inboard flaps can be actuated together in a common direction for longitudinal control, while the intermediate and outer flaps can be moved differentially for roll and yaw action. Control systems capable of operating the flaps in the proper manner can vary considerably, the general principles being well known.

In transition from short take off (STAL), or vertical take off (VTOL), the jet curtain can be deflected rearwardly by the flaps to provide a forward thrust component in addition to that of the primary propulsion engines and assists the aircraft in reaching cruising speed as rapidly as possible. Because of this system the aircraft can be designed with a small wing which is efficient at cruising speed and does not require the usual large wing to develop lift at low speeds. When the required speed is reached the jet pumps can be shut off and the ducts closed. For landing the system is put into operation as forward speed is reduced and, if required, the flaps 32 could even be directed forwardly to deflect the jet curtain for producing higher drag and/or braking forces for glide angle or hover control or braking on the ground.

By utilizing a pressure reservoir 60 the system is independent of the primary propulsion system and, even in the event of an engine failure at a critical time, the system will be effective to ensure a safe landing using the stored air and fuel for the jet pumps. With the jet curtain and boundary layer control effective over such a large portion of the wings and the stored power arrangement, the safety factor of the aircraft is very high.

*Modified System*

A slightly modified system illustrated in FIGURE 6 is particularly suitable for jet propelled aircraft and is capable of providing full vertical take off and landing performance. The basic system as described above is unchanged, the difference being in the addition of a secondary jet pump 72 in the outlet 30, which may be similar to the jet pump 44. Instead of receiving air from the pressure reservoir 60, however, the secondary jet pump 72 has an inlet 74 connected by a suitable conduit 76 to the tailpipe 78 of a jet engine 80, which comprises the primary propulsion means for the aircraft. Valves 82 and 84 are mounted in the tailpipe 78 to divert engine exhaust gases to the secondary jet pump 72, as indicated in full line in FIGURE 6. The exhaust gases add to the mass flow from outlets 30 and greatly increase entrainment of ambient air, both through ducts 38 and under the wings. When fuel is supplied to the secondary jet pump 72 from a supply line 54 and ignited to burn with the exhaust gases, the effect is similar to that of an afterburner, with greatly increased thrust. Due to the mixing of the combustion gases with the air flowing through the duct, the temperature of the ultimate jet curtain flow is not excessive. For normal forward flight the valves 82 and 84 are moved to the positions indicated in broken line to allow the jet engine exhaust to emerge from tailpipe 78, flow to the jet pump 72 then being shut off.

With this system a wide range of performance is possible. By operating only the jet pump 44, short take off and landing performance is obtained. When jet engine exhaust gases are added through the secondary jet pump 72 the take off and landing requirements are again reduced, while with afterburning, vertical flight is possible. Thus performance can be controlled as required to suit various payload and terrain conditions.

The system is very simple and compact, the major portion being incorporated into the panels 24 which are easily removed for servicing. The structure is light in weight with no complex ducting and the only moving parts are the control flaps 32 and the panels 24 themselves, which merely open and close when the system is actuated and shut off.

It is understood that minor variation from the form of the invention disclosed herein may be made without departure from the spirit and scope of the invention, and that the specification and drawings are to be considered as merely illustrative rather than limiting.

We claim:
1. In an aircraft wing:
   a spanwise inlet adjacent the trailing edge of the wing;
   a spanwise downwardly directed outlet in the lower surface of the wing forwardly of the trailing edge;
   a duct directly connecting said inlet and outlet;

airflow generating means operatively connected with said duct to direct airflow downwardly through said outlet;

and control flaps pivotally mounted in said outlet to direct the airflow therefrom.

2. In an aircraft wing:
a spanwise inlet adjacent the trailing edge of the wing;
a spanwise downwardly directed outlet in the lower surface of the wing forwardly of the trailing edge;
a duct directly connecting said inlet and outlet;
jet pump means operatively connected with said duct to entrain air through said inlet and eject the air through said outlet to provide an air curtain downwardly from the wing;
and control flaps pivotally mounted in said outlet to direct the airflow therefrom.

3. The structure according to claim 2 and including secondary, downwardly directed jet pump means mounted in said outlet;
and a source of compressed gases connected to said secondary jet pump means.

4. A V/STOL system for aircraft, comprising:
a wing having a recessed lower rear portion extending forwardly from the trailing edge of the wing;
a panel mounted in said recessed portion and constituting the lower rear portion of said wing in one position;
said panel being movable downwardly from said wing to a second position and defining a duct between said recessed portion and the panel with an inlet at the trailing edge thereof;
said duct having a downwardly directed outlet at the forward end thereof below said wing;
and airflow generating means operatively mounted in said duct to direct air downwardly through said outlet.

5. A V/STOL system according to claim 4, wherein said airflow generating means comprises a jet pump mounted on top of said panel;
said recessed portion having a channel to receive said jet pump when said panel is in said one position.

6. A V/STOL system according to claim 4 and including a control flap pivotally mounted on said wing at the forward edge of said recessed portion and being adjustable to control the airflow from said outlet.

7. A V/STOL system for aircraft comprising:
a wing having a spanwise recessed lower rear portion extending forwardly from the trailing edge of the wing;
a panel mounted in said recessed portion and constituting the lower rear portion of said wing in one position;
the forward edge of said panel being spaced from the forward edge of said recessed portion and defining an outlet therebetween;

said panel being pivotally attached to said wing at the forward edge thereof to swing downward from the wing to a second position, defining a duct having an inlet at the trailing edge and communicating with said outlet;
and airflow generating means operatively mounted in said duct to draw air into said inlet and direct the air downwardly from said outlet.

8. A V/STOL system for aircraft comprising:
a wing having a spanwise recessed lower rear portion extending forwardly from the trailing edge of the wing;
a panel mounted in said recessed portion and constituting the lower rear portion of said wing in one position;
the forward edge of said panel being spaced from the forward edge of said recessed portion and defining an outlet therebetween;
said panel being pivotally attached to said wing at the forward edge thereof to swing downward from the wing to a second position, defining a duct having an inlet at the trailing edge and communicating with said outlet;
and spanwise extending jet pump means operatively mounted in said duct to generate airflow through the duct and downwardly from said outlet.

9. A V/STOL system according to claim 8 and including control flaps pivotally mounted on said wing at the forward edge of said recessed portion;
said control flaps being adjustable to control airflow from said outlet and being movable to a closed position to cover said outlet when said panel is in said one position.

10. A V/STOL system according to claim 8 and including a secondary, downwardly directed jet pump mounted in said outlet and being operable independently of said first mentioned jet pump.

11. A V/STOL system according to claim 10 and including a source of combustible fuel and a source of high velocity exhaust gases connected to said secondary jet pump, whereby the jet pump constitutes an afterburner element.

References Cited in the file of this patent
UNITED STATES PATENTS

| | | |
|---|---|---|
| 2,605,984 | Robinson | Aug. 5, 1952 |
| 2,928,626 | Tino | Mar. 15, 1960 |
| 3,012,740 | Wagner | Dec. 12, 1961 |

FOREIGN PATENTS

| | | |
|---|---|---|
| 291,388 | Great Britain | July 26, 1928 |
| 885,666 | Great Britain | Dec. 28, 1961 |

OTHER REFERENCES

Page 106 of Dictionary of Aeronautical Engineering, by J. L. Naylor, published 1959 by Philosophical Library.